Figure 3:
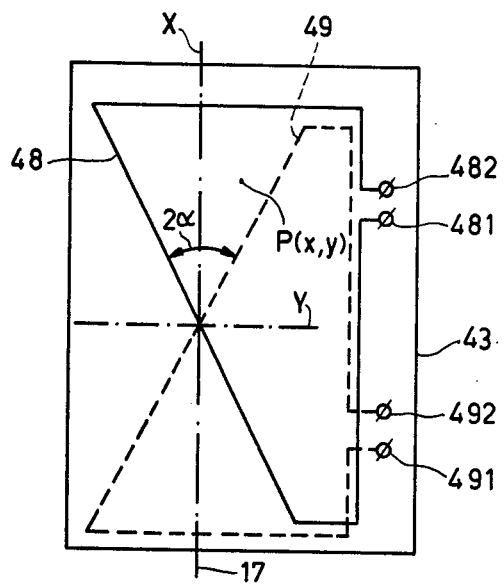

United States Patent [19]

Albarda et al.

[11] 4,106,029

[45] Aug. 8, 1978

[54] DEVICE FOR RECORDING MEASURING VALUES

[75] Inventors: Scato Albarda; Willem Van Der Hoek, both of Eindhoven, Netherlands; Dominique Yves Marie Taupin, Paris, France

[73] Assignee: U.S. Philips Corporation, New York, N.Y.

[21] Appl. No.: 802,905

[22] Filed: Jun. 2, 1977

[30] Foreign Application Priority Data

Jun. 15, 1976 [NL] Netherlands .......................... 7606436

[51] Int. Cl.$^2$ ........................................... G01D 15/16
[52] U.S. Cl. .............................. 346/117 A; 346/139 R
[58] Field of Search ....................... 346/117 A, 139 R

[56] References Cited

U.S. PATENT DOCUMENTS

| 2,442,586 | 6/1948 | Clark | 346/139 R |
| 3,184,754 | 5/1965 | Peltola | 346/139 R X |

*Primary Examiner*—George H. Miller, Jr.
*Attorney, Agent, or Firm*—Frank R. Trifari; David R. Treacy

[57] ABSTRACT

A device for recording measuring values on a record carrier by means of two approximately parallel, linear motors which are pivotably connected to two arms which are both connected to a single recording head. A signal generator produces signals which indicate the position of the recording head and a control device controls the motors so that the recording head is moved, without a mechanical guide, along a straight line which is perpendicular to the transport direction of the record carrier.

4 Claims, 7 Drawing Figures

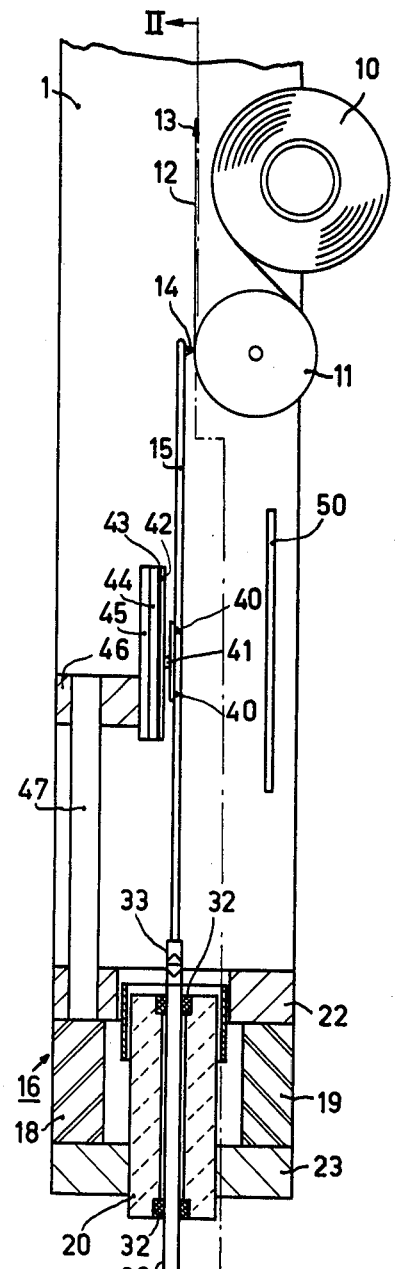
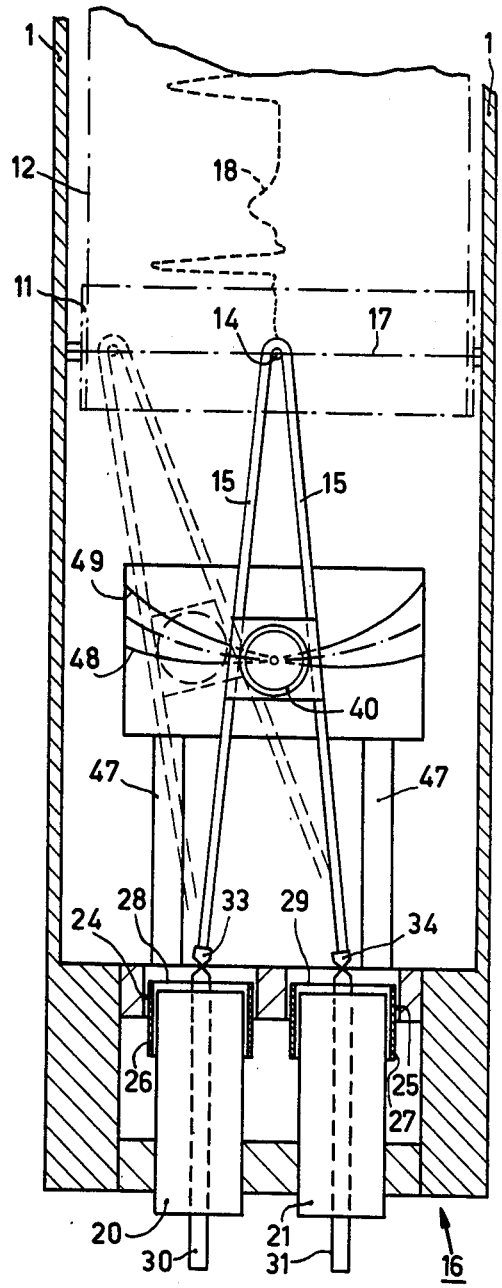
Fig.1
Fig.2

DEVICE FOR RECORDING MEASURING VALUES

The invention relates to a device for recording measuring values, comprising a transport mechanism for transporting a strip-shaped record carrier in its longitudinal direction, a recording pin which is displaceable in accordance with the variation of the measuring value to be recorded, by means of an electromagnetic drive, along a straight line parallel to the surface of the record carrier and perpendicular to the transport direction thereof, and a signal generator which is capable of generating a signal which is dependent of the position of the recording pin. A device of this kind is known from German Offenlegungsschrift 2,139,032. In the known device the recording pin is moved to and fro in a guide slot by a pivotable arm whereto the pin is connected by way of a pivot construction. This type of guiding of the recording pin requires a comparatively large mass on the end of the arm; this necessitates a substantial force at higher recording frequencies and causes a comparatively large amount of friction on a large arm, so that the energy consumption of the device is high. This is undesirable, notably in the case of battery powered apparatus. The invention has for its object to provide a device of the described kind in which the linear movement of the recording pin is realized completely by electrical control of the drive, so that no additional friction losses are introduced. To this end, the invention is characterized in that the drive is formed by two linear motors, the operating directions of which are approximately parallel, each motor comprising a static portion and a moving portion, the moving portion of each motor being pivotably connected to an arm, the said arms being connected to a recording head which comprises the recording pin, the signal generator being adapted to generate signals in dependence of the position of the recording pin in the direction of the said line as well as in the transport direction of the record carrier, a control circuit being provided which is adapted to control the drive so that no undesired displacement of the recording pin occurs in the transport direction.

The signal generator of the known device consists of a sliding contact which slides over a resistance track which also introduces additional friction. In order to eliminate this friction also, a preferred embodiment of the device in accordance with the invention is characterized in that the signal generator comprises a stationary and a movable portion, the said portions not being in wiping electrical contact with each other.

The invention will be described in detail hereinafter with reference to the accompanying diagrammatic drawing.

Figure 4:
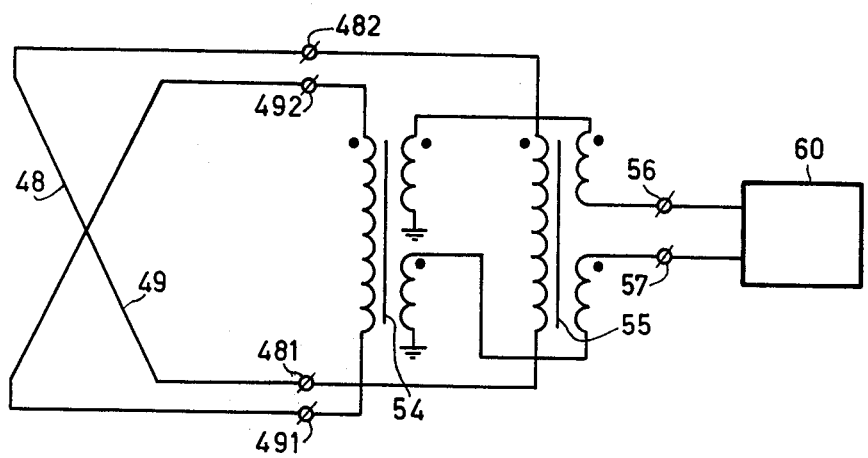
Figure 5:
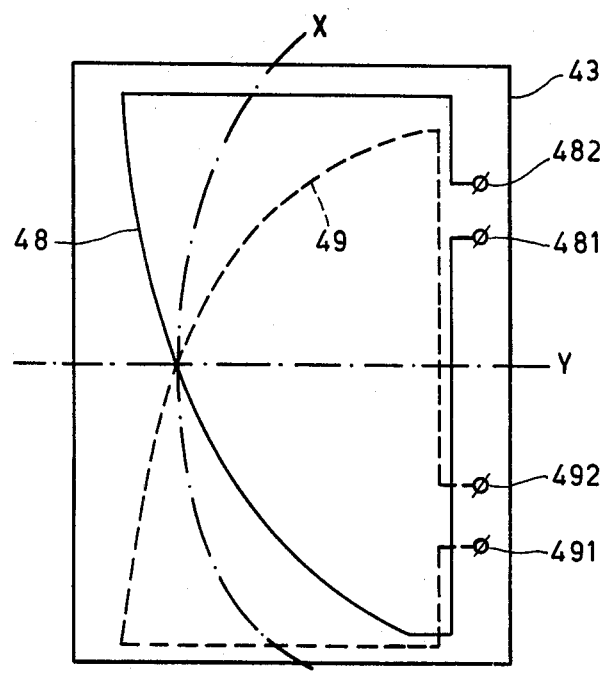
Figure 6:
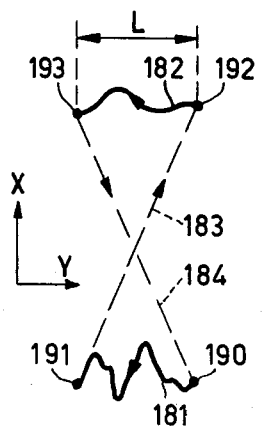
Figure 7:
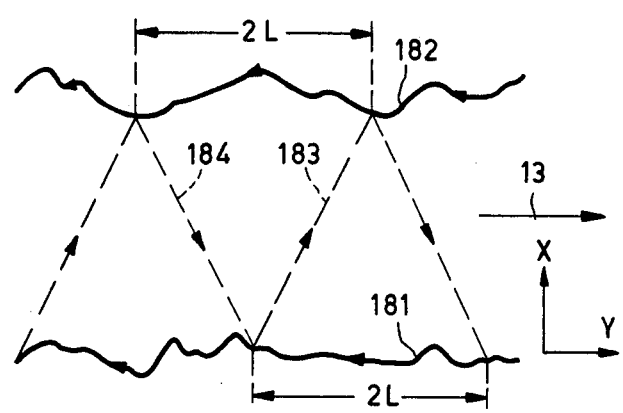

FIG. 1 is a vertical longitudinal sectional view of an embodiment of a device in accordance with the invention, FIG. 2 is a bottom view (partial sectional view) of the device shown in FIG. 1, FIG. 3 shows a part of a signal generator for the device shown in FIGS. 1 and 2, FIG. 4 shows a circuit for the component shown in FIG. 3, FIG. 5 shows a further embodiment of the component shown in FIG. 3, and FIGS. 6 and 7 show examples of a special application of the device in accordance with the invention.

The device shown in the FIGS. 1 and 2 comprises a frame 1 in which a supply roller 10 and a transport roller 11 are journalled. The transport roller 11 is driven by a motor (not shown) so that both rollers form a known transport mechanism for a record carrier 12 in the form of a strip of paper. This transport mechanism moves the record carrier 12 in the direction of the arrow 13 along a recording head 14 which is connected to a drive 16 by way of arms 15. This drive is capable of moving the recording head 14 along a straight line 17, perpendicularly to the transport direction of the record carrier 12, in correspondence with a measuring value which is then recorded on the record carrier in the form of a curve 18. The record carrier 12 may consist, for example, of normal paper on which recording is effected with ink, or of heat-sensitive paper on which recording is effected by means of a heated pen, or of paper which is sensitive to current passage etc.

The drive 16 comprises a magnetic circuit with magnets 19, cores 20 and 21, yokes 22 and 23 and air gaps 24 and 25. In the air gaps there are provided coils 26 and 27 which are connected, via supports 28 and 29, to shafts 30 and 31. The shafts 30 and 31 are journalled and aligned to be axially displaceable in bearings 32, so that the coils 26, 27 are also movable in the air gaps 24, 25 in the axial direction. A movement of this kind takes place when a current is passed through the coils via connection leads (not shown). The movement can be controlled by variation of the intensity and the direction of this current. The supports 28, 29 are connected to the arms 15 by way of pivots 33 and 34 respectively.

Within given limits, the recording head 14 can be made to follow any desired traject by suitable control of the coils 26 and 27. The recording head 14 must usually be guided along the straight line 17. FIG. 2 shows the recording head 14 in the central position and in one of the extreme positions (denoted by broken lines).

For the control of the current through the coils 26 and 27 it is necessary to know exactly the position of the recording head 14 at any instant. To this end, the device comprises a signal generator which consists of a transmission coil 40 which is mounted on one of the arms 15 and two receive coils 48 and 49 which are provided on a substrate 43 in the form of printed wiring. When the transmission coil 40 is excited with an alternating voltage of high frequency, a high-frequency magnetic field is produced, part of the said field being enclosed by the receive coils 48 and 49. The part which is enclosed depends on the position of the transmission coil 40 relative to the receive coils 48 and 49.

The lower side of the support 43 is covered by a cover plate 42, whilst the upper side is covered by two plates 44 and 45 which are both made of a synthetic material which is clad on one side (the upper side) with copper. These plates absorb the high-frequency field of the coil 40, so that this field does not leave the device. A metal plate 50, preferably forming part of the frame 1, has the same function for the high-frequency field in the downward direction.

The assembly of the plates 42 to 45 is connected to the drive 16 by way of a block 46 and two rods 47.

The cover plate 42 also serves to take up the recording pressure of the recording head 14 via a sliding pin 41. A constant distance between the transmission coil 40 and the receive coils 48, 49 is thus automatically ensured.

The position of the tranmission coil 40 on the centre line of the arm can in principle be chosen at random. For an explanation of the signal generator on the basis of the FIGS. 3 and 4 it will be assumed that the transmission coil 40 is not arranged halfway the arm as shown in the FIGS. 1 and 2, but at the end i.e. concentric to the recording head 14. The receive coils 48 and 49 may then be shaped as shown in FIG. 3. The coil 48 is provided on the upper side of the support 43 and the coil 49 (denoted by broken lines) is provided on the lower side. Each of the coils is shaped as a rectangular trapezium; at the area where the oblique sides intersect each other at an angle $2\alpha$, the origin of an orthogonal system of co-ordinates is situated, the X-axis thereof coinciding with the straight line 17. In order to clearly show the course of the conductors constituting the coils, the coil 49 is shown slightly shifted relative to the coil 48. Actually, the extreme right portions of the two coils cover each other. The coils 48 and 49 are provided with connection points 481, 482 and 491, 492, respectively.

Each of the two coils 48, 49 constitutes, together with the transmission coil 40 (not shown in FIG. 3), a transformer having a variable coupling. When the centre of the transmission coil is situated opposite a point P with the co-ordinates $x$, $y$, a voltage $V_{48} = V_O(x.\sin\alpha + y.\cos\alpha)$ appears between the connection points 481, 482 and a voltage $V_{49} = V_O(-x\sin\alpha + y.\cos\alpha)$ appears between the connection points 491, 492. Therein, $V_O$ is proportional to the voltage across the transmission coil 40.

By means of the circuit shown in FIG. 4, two voltages $V_x$ and $V_y$ can be derived therefrom, the said voltages depending exclusively on $x$ and $y$, respectively. To this end, the voltage $V_{48}$ is applied to a transformer 54 having two separate secondary windings, the voltage $V_{49}$ being applied to a similar transformer 55. One of the secondary windings of the transformer 54 is connected to one of the secondary windings of the transformer 55 in a manner so that the difference between the two secondary voltages appears on the output 56, whilst the two other secondary windings are connected to each other so that the sum of the two secondary voltages appears on the output 57. Assuming that the winding ratio of each of the four transformers equals $n$, it will be obvious that the voltage on the output 56 equals $V_x = 2V_O n.x \sin\alpha$, whilst that on the output 57 equals $V_y = 2V_O n.y \cos\alpha$. The outputs 56 and 57 are connected to a known control circuit 60 which controls the currents through the coils 26 and 27.

Each of the coils 48, 49 of the described embodiment consists of one turn. It will be obvious that the sensitivity of the system can be increased by using a number of parallel extending turns per coil. Coils of this kind can be readily manufactured using the known techniques for manufacturing printed wiring.

In the foregoing, the position of the transmission coil 40 has been assumed to be concentric to the recording head 14, so that the X-axis along which the coil 40 is to be moved coincides with the recording line 17. If the coil 40 is arranged nearer to the drive 16, the centre of the coil must describe an ellipse for guiding the recording head 14 along the straight line 17. This ellipse changes to a circle when the transmission coil 40 is arranged halfway the arm 15 as shown in the FIGS. 1 and 2. This means that the X-axis of the system of co-ordinates shown in FIG. 3 changes to an arc of a circle, whilst the crossing conductors of the coils 48, 49 are correspondingly curved. These coils then have the shape shown in FIG. 5. The circuit of FIG. 4 can be used for this purpose without modification. The arrangement of the transmission coil 40 halfway the arms offers a number of advantages:

because the coil 40 is situated nearer to the pivot of the arms 15, the effect of its mass is reduced, the recording head 14 is not covered by the coil 40, so that the curve 18 can be read sooner, the width of the support 43, which must always be larger than the stroke of the coil 40, need not be larger than the recording width as a result of the smaller stroke of this coil.

The described construction of the device is given, of course, merely by way of example; various alternatives are feasible. For example, the shafts 30 and 31 may enclose a small angle with each other, so that the angle of rotation of the pivots 33 and 34 is reduced.

If desired, the drive 16 comprising moving coils can be replaced by an other drive, for example, comprising a moving armature and stationary coils.

If desired, the construction of the signal generator may also be different. A different shape of the coils 48, 49 may also be chosen, and use can also be made of, for example, capacitive or optical signal generators.

The foregoing description is based on the assumption that the recording head 14 moves exclusively along the line 17 during the recording of the curve 18, i.e. exclusively in the X-direction of FIG. 3. However, it is alternatively possible to control the recording head so that it moves in the X-direction as well as in the Y-direction. When this possibility is utilized, two curves can be recorded by means of one recording head as will be described with reference to the FIGS. 6 and 7. The FIG. 6 shows the traject to be followed by the recording head in order to record a part, having a length 2L, of each of the two curves 181 and 182. Each time a part of a curve, for example, 181 is recorded whilst the X-signal of the other curve (182) is temporarily stored in a memory (not shown). During the recording of a part of the length 2L of the curve 181, the recording head moves over a distance L in the negative Y-direction (to the left, viewed from the starting point 190 in FIG. 6), whilst the stored X-signal is read at double the speed and is also applied to the recording head. When the point 191 is reached, the recording head very quickly moves over a distance L again in the position Y-direction and over a distance in the X-direction which is determined by the local distance between the curves 181 and 182. The starting point 192 of the part of the curve 182 to be recorded is then reached via the line 183 (denoted by a broken line). The line 183 is completed so fast that no visible track is recorded on the record carrier. If necessary, the recording head may be switched off during the completion of this project. Subsequently, a part of the curve 182 is recorded in the same way as the part of the curve 181 until the point 193 is reached, after the recording head quickly returns, via the line 184 which is not recorded either, to the starting point 192.

When there is no record carrier transport, the figure shown in FIG. 6 which represents the movement of the recording head is recorded again and again. However, if the record carrier is transported in the direction of the arrow 13 (see FIG. 7) at a speed such that the record carrier exactly completes a distance L in the positive Y-direction, whilst the recording head completes this distance in the negative Y-direction, the successively recorded parts of the curves 181 and 182 (each time having a length 2L) exactly connect, so that two non-interrupted curves are recorded.

Thus, for the recording of two curves 181 and 182 it is sufficient to control the recording head in the Y-direction by means of a sawtooth signal, and in the X-direction by means of a measuring value signal which is associated with one of the curves and which is read from a memory at double the speed, the measuring value signal of the other curve being stored in a memory.

What is claimed is:

1. A device for recording measuring values, comprising a transport mechanism for transporting a strip-shaped record carrier in its longitudinal direction, a recording pin which is displaceable in accordance with the variation of the measuring value to be recorded, by means of an electromagnetic drive along a straight line parallel to the surface of the record carrier and perpendicular to the transport direction thereof, and a signal generator which is capable of generating a signal which is dependent of the position of the recording pin, characterized in that the drive (16) is formed by two linear motors, the operating directions of which are approximately parallel, each motor comprising a static portion and a moving portion, the moving portion (26, 27) of each motor being pivotably connected to an arm (15) the said arms being connected to a recording head (14) which comprises the recording pin, the signal generator being adapted to generate signals in dependence of the position of the recording pin in the direction of the said line (17) as well as in the transport direction of the record carrier (12), a control circuit (60) being provided which is adapted to control the drive so that substantially no undesired displacement of the recording pin occurs in the transort direction.

2. A device as claimed in claim 1, characterized in that the signal generator comprises a stationary and a movable portion, the said portions not being in wiping electrical contact with each other.

3. A device as claimed in claim 2, characterized in that the movable portion of the signal generator comprises a transmission coil (40) which is connected to the arms (15), the stationary portion comprising two receive coils (48, 49) which are arranged to be stationary in the vicinity of the transmission coil (40), each receive coil constituting, together with the transmission coil, a transformer having a variable coupling.

4. A device as claimed in claim 2, characterized in that the movable portion of the signal generator is situated approximately halfway the arms (15).

* * * * *

UNITED STATES PATENT AND TRADEMARK OFFICE
CERTIFICATE OF CORRECTION

PATENT NO. : 4,106,029             Page 1 of 5
DATED : August 8, 1978
INVENTOR(S) : SCATO ALBARDA ET AL It is certified that error appears in the above-identified patent and that said Letters Patent are hereby corrected as shown below:

Col. 1, line 13, Change "is dependent of" to --depends on-- line 15, after "032" insert --, to which U.S. patent 3,683,410 corresponds-- line 17, change "whereto" to --to which-- line 24, change "notably" to --especially--; delete "the case of";

line 25, delete "invention has for its" after "object" insert --of the invention is-- line 29, delete "To this end, and insert as a new paragraph "In a recording device according to-- line 30, delete "is characterized in that"

line 34, delete "said"

line 37, delete "in dependence of" and insert --which depend on-- line 43, after "generator" change "of" to --used in--;

UNITED STATES PATENT AND TRADEMARK OFFICE
CERTIFICATE OF CORRECTION

PATENT NO. : 4,106,029

DATED : August 8, 1978

INVENTOR(S) : SCATO ALBARDA ET AL

It is certified that error appears in the above-identified patent and that said Letters Patent are hereby corrected as shown below:

Col. 1, line 43, before "known" insert --previously--; before "device" insert --recording-- line 46, before "a" insert --in--; delete "of"

line 47, delete "the device"; delete "is charac-"

line 48, delete "terized in that"

line 49, change "the said" to --these-- line 67, delete "the"

Col. 2, line 7, delete "way of"

line 20, change "via" to --by-- line 25, change "via" to --by-- line 31, change "traject" to --path-- line 45, delete "said"

line 50, change "whilst" to --and-- line 59, delete "way of"

line 61, change "via" to --through--

UNITED STATES PATENT AND TRADEMARK OFFICE
CERTIFICATE OF CORRECTION

PATENT NO. : 4,106,029
DATED : August 8, 1978
INVENTOR(S) : SCATO ALBARDA ET AL

It is certified that error appears in the above-identified patent and that said Letters Patent are hereby corrected as shown below:

Col. 2, line 65, change "centre" to --center--

Col. 3, line 2, change "i.e." to --; that is,-- line 8, change "trapezium" to --trapezoid-- line 20, change "centre" to --center-- line 37, change "whilst" to --while-- line 43, change "whilst" to --while-- line 57, change "centre" to --center-- line 61, after "halfway" insert --down--; and before "FIGS." delete "the"

line 64, change "whilst" to --and--

Col. 4, line 1, after "halfway" insert --down-- line 17, change "an other" to --another-- line 25, change "i.e." to --; that is,-- line 32, change "traject" to --path-- line 35, change "whilst" to --while-- line 41, change "whilst" to --while--

UNITED STATES PATENT AND TRADEMARK OFFICE
CERTIFICATE OF CORRECTION

PATENT NO. : 4,106,029  
DATED : August 8, 1978  
INVENTOR(S) : SCATO ALBARDA ET AL It is certified that error appears in the above-identified patent and that said Letters Patent are hereby corrected as shown below:

Col. 4, line 48, change "via" to --by-- line 55, change "via" to --by-- line 63, change "whilst" to --while--

IN THE CLAIMS:

Col. 5, Claim 1, line 15, delete "means of"

line 19, delete "is dependent of" and insert --depends on-- line 20, delete "(16)"

line 23, delete "(26,27)"

line 24, delete "(15)" and insert --,-- line 25, delete "(14)"

Col. 6, line 1, delete "," and insert --;-- line 2, change "being" to --is--; change "in dependence of" to --which depend on-- line 3, delete "said"

UNITED STATES PATENT AND TRADEMARK OFFICE
CERTIFICATE OF CORRECTION

PATENT NO. : 4,106,029
DATED : August 8, 1978
INVENTOR(S) : SCATO ALBARDA ET AL

It is certified that error appears in the above-identified patent and that said Letters Patent are hereby corrected as shown below:

Col. 6, line 4, delete "(17)"

line 5, delete "(12)," and insert --; and the device includes--; delete "(60) being provided"

line 6, delete "which is"

Col. 6, Claim 2, line 11, delete "the"

Claim 3, line 15, delete "(40)"

line 16, delete "(15)," and insert --, and--; change "comprising" to --comprises-- line 17, delete "(48, 49)"

line 18, delete "(40)"

Claim 4, line 23, after "halfway" insert --down--; delete "(15)".

Signed and Sealed this

Third Day of March 1981

[SEAL]

Attest:

RENE D. TEGTMEYER

Attesting Officer

Acting Commissioner of Patents and Trademarks